United States Patent
Chen et al.

(10) Patent No.: US 8,536,829 B2
(45) Date of Patent: Sep. 17, 2013

(54) CHARGING SYSTEM

(75) Inventors: Shih-Hui Chen, Taoyuan Hsieh (TW);
Chin-Tien Lin, Taoyuan Hsieh (TW)

(73) Assignee: Tennrich International Corp., Taoyuan Hsieh (TW)

( * ) Notice: Subject to any disclaimer, the term of this patent is extended or adjusted under 35 U.S.C. 154(b) by 258 days.

(21) Appl. No.: 13/033,892

(22) Filed: Feb. 24, 2011

(65) Prior Publication Data
US 2012/0217925 A1     Aug. 30, 2012

(51) Int. Cl.
*H02J 7/00*     (2006.01)

(52) U.S. Cl.
USPC .......................................... 320/108; 320/107

(58) Field of Classification Search
USPC .................................. 320/108, 107
See application file for complete search history.

(56) References Cited

U.S. PATENT DOCUMENTS

| | | | |
|---|---|---|---|
| 7,435,094 B2 * | 10/2008 | Chang | 439/39 |
| 7,963,773 B2 * | 6/2011 | Palli et al. | 439/38 |
| 8,172,580 B1 * | 5/2012 | Chen et al. | 439/39 |
| 8,269,454 B2 * | 9/2012 | Yang | 320/107 |
| 8,342,857 B2 * | 1/2013 | Palli et al. | 439/38 |
| 2005/0264472 A1 * | 12/2005 | Rast | 345/30 |
| 2007/0072443 A1 * | 3/2007 | Rohrbach et al. | 439/39 |
| 2007/0109273 A1 * | 5/2007 | Orsley et al. | 345/173 |
| 2011/0234154 A1 * | 9/2011 | Navid | 320/108 |

* cited by examiner

*Primary Examiner* — M'Baye Diao
(74) *Attorney, Agent, or Firm* — Jackson IPG PLLC

(57) ABSTRACT

A charging system conveniently allows an electric device to be quickly disconnected and taken by a user. The charging system comprises at least one adapter unit and a power supply unit, wherein the adapter unit and the power supply unit utilize magnetic attraction to achieve a desire junction effect. It does not only form a power transmission between the power supply unit and the electronic product, but also separates the electronic product from the power supply unit by slightly imposing forces such that the electronic product can be quickly taken without influencing the operation of the electronic product.

17 Claims, 15 Drawing Sheets

CHARGING SYSTEM

BACKGROUND OF THE INVENTION

1. Field of the Invention

The present invention relates to a charging system, and more particularly to the charging system capable of retaining a desire junction effect between a power supply unit and an electronic product and capable of allowing the electronic product to be quickly disconnected and taken for daily use.

2. Description of the Related Art

Since the technology is continuously developed, people may require electronic products to have more functions, especially for consumer electronics. A conventional electronic product having larger size (e.g. a compact disc player, a telephone or a desktop computer) is simplified to form a portable electronic product with high efficiency (e.g. a multimedia player (MPEG Audio Layer-3, MP3), a mobile phone or a laptop computer) to increase the efficiency for people in daily life.

The power required for the foregoing portable electronic products is mostly adapted with a rechargeable battery such as a nickel-metal hydride battery or a lithium cell. The rechargeable battery is mainly charged by a charging device. The charging device comprises a charging seat and a power source plug. The charging seat and the power source plug are connected by wires, and the charging seat is disposed with a power conversion module and a charging slot so that the rechargeable battery can be placed in the charging slot to supply power for the electronic products during the power charging mode.

Some charging devices integrate the power conversion module into a side of the power source plug and are electrically connected to the electronic products through a wire equipped with an electric connector to supply power for the electronic products during the power charging mode. Moreover, when some portable electronic products are used, a charging device as a movable power is carried to charge the electronic product.

However, the portable electronic products are charged by a power supply system with grid-connection or the movable power source, the portable electronic products are electrically connected to the charging device through wires or the electric connector. While immediately taking the electronic products (e.g. an important call is coming when the mobile phone is charging), the electronic products are still connected with wires which causes inconvenience.

SUMMARY OF THE INVENTION

In view of the shortcomings of the prior art, the inventor(s) of the present invention based on years of experience in the related industry to conduct extensive researches and experiments, and finally developed a charging system as a principle objective so that a desire junction effect between a power supply unit and an electronic product can be retained, and the electronic product can be quickly taken by slightly imposing force.

To achieve the foregoing objective, the charging system of the invention basically comprises at least an adapter unit and a power supply unit. Two ends of a casing of the adapter unit is equipped with a first coupling unit and a second coupling unit respectively and electrically connected to the power supply unit and the electronic product. A casing of the power supply unit is disposed with a third coupling portion electrically connected to the first coupling portion of the adapter unit. A first magnetic attraction unit and a second magnetic attraction unit, which are attracted to each other, are respectively disposed to a coupling place between the adapter unit and the power supply unit.

When the invention is implemented, the charging system has a power conversion module disposed inside the casing of the power supply unit. The power conversion module convert alternating current power into direct current power required for charging or operating the electronic product.

When the invention is implemented, the charging system has at least one rechargeable battery disposed inside the casing of the power supply unit. The rechargeable battery supplies direct current power required for charging or operating the electronic product so as to form a movable power source.

When the invention is implemented, the charging system has at least one rechargeable battery and a power conversion module disposed inside the casing power supply unit. The power conversion module converts alternating current power into direct current power as a supplement power for the rechargeable battery, and the rechargeable battery supplies power required for charging or operating the electronic product so as to form a movable power source.

Under each structural form, the first magnetic attraction component and the second magnetic attraction component are respectively composed of a magnet and an iron member.

Under each structural form, the first magnetic attraction component and the second magnetic attraction component are composed of magnets.

Under each structural form, the charging system can integrate a voltage step-down circuit inside the casing of the adapter unit or the power supply unit, and a detection circuit electrically connected to the third coupling portion and the voltage step-down circuit. Output voltages of the voltage step-down circuit are automatically regulated through the detection circuit detecting a state of the electronic product, thereby supplying power required for charging or operating the electronic product.

Specifically, the charging system of the invention further has a storage unit for containing the power supply unit under a structural form as the movable power source. The storage unit has a channel for entering and exiting the electronic product and deeply positioning the electronic product, thereby ensuring the coupling of the adapter unit and the power supply unit.

DETAILED DESCRIPTION OF THE PREFERRED EMBODIMENTS

The foregoing and other technical characteristics of the present invention will become apparent with the detailed description of the preferred embodiments and the illustration of the related drawings.

Figure 1:
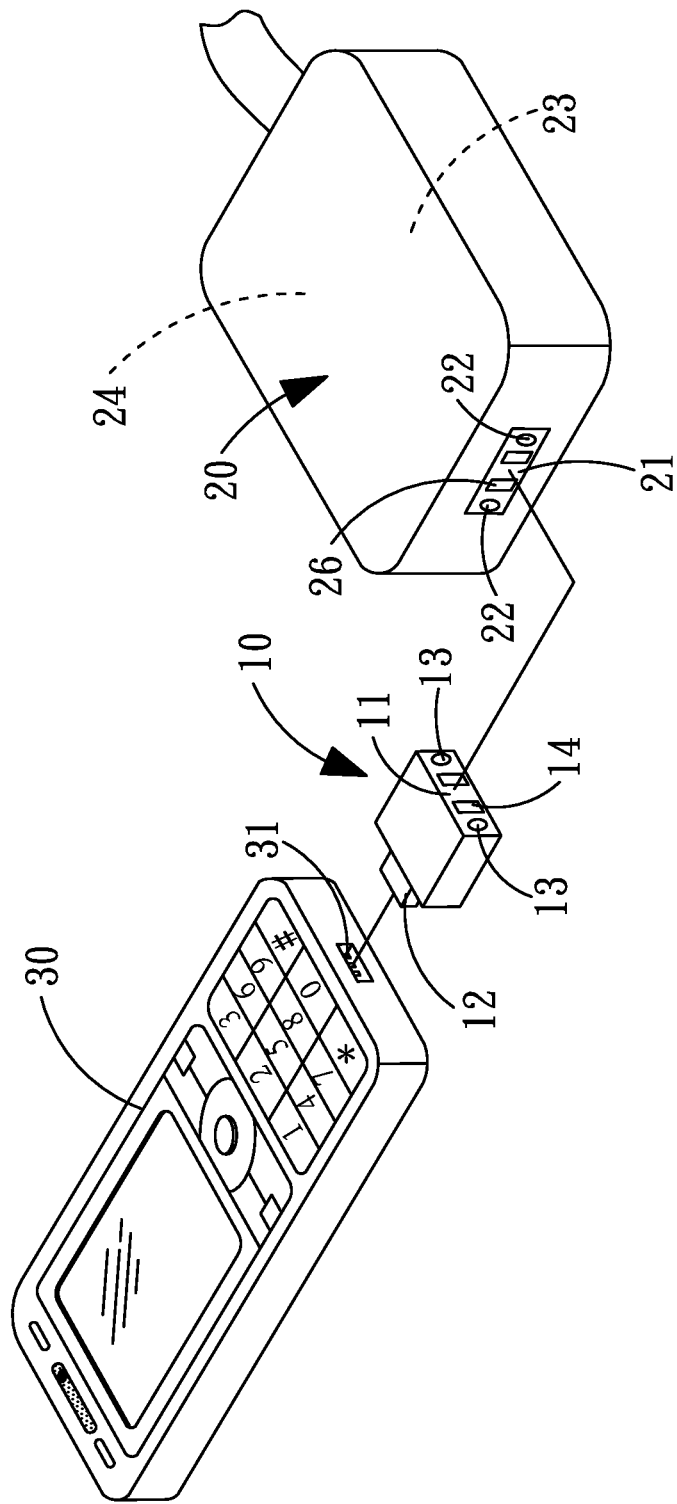
FIG. 1 is a three-dimensional drawing of an appearance of a charging system according to a first embodiment of the present invention.
Figure 2:
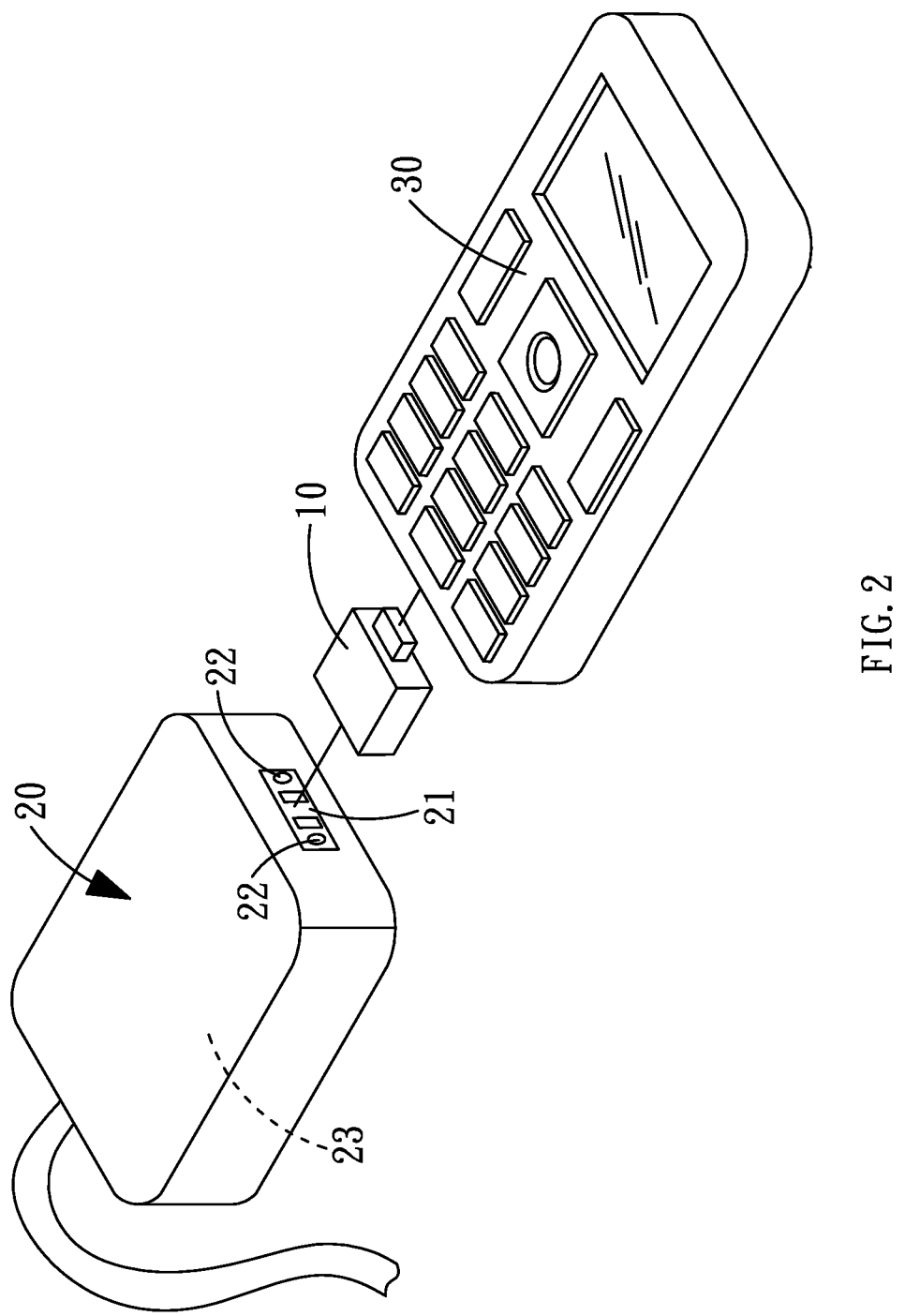
FIG. 2 is a three-dimensional drawing of an appearance of a charging system at another visual angle according to a first embodiment of the present invention.

With reference to FIG. 1 and FIG. 2 for a three-dimensional drawing of a charging system in accordance with a first embodiment of the invention and a three-dimensional drawing of a charging system at another view angle in accordance with a first embodiment of the invention are depicted. The charging system 10 of the invention comprises at least one adapter unit 10 and a power supply unit 20. Each adapter unit 10 is to dispose a first coupling portion, which is electrically connected to the power supply unit 20, on a casing and a second coupling portion 12 electrically connected to an electronic product 30. The second coupling portion 12 is equipped with electrode contacts (not shown in the figure) matching with a predetermined format of the electronic product 30.

The power supply unit 20 supplies power required for charging or operating the electronic product 30 and is equipped with a third coupling portion 21 that is electrically connected to the adapter unit 20.

A first magnetic attraction component 13 and a second magnetic attraction component 22, which attract to each other, are respectively disposed to a coupling place between the adapter unit 10 and the power supply unit 20. The first magnetic attraction component 13 and the second magnetic attraction component 22 are respectively composed of a magnet and an iron member or composed of magnets. A desire junction effect between the adapter unit 10 and the power supply unit 20 can be retained by utilizing the attraction effect of the first magnetic attraction component 13 and the second magnetic attraction component 22.

When the charging system of the invention is in use, the first coupling portion 11 and the second coupling portion 12 of the adapter unit 10 are utilized to electrically connect the power supply unit 20 and the electronic product 30. The electronic product 30 has at least one electrode contact 31. The power transmission between the power supply unit 20 and the electronic product 30 can be formed by contacting each electrode contact such that the electronic product 30 is charged by utilizing the power supply unit 20. Of course, the charging system of the invention can be equipped with other adapter unit, which is different from the specification of the second coupling portion, to replace different electronic products.

Specifically, while urgently taking the electronic product 30, the electronic product 30 can be separated from the power supply unit 20 to quickly use the electronic product 30 by slightly impose forces. The operation of the electronic product 30 may not be influenced due to the power supply unit 20.

Figure 3:
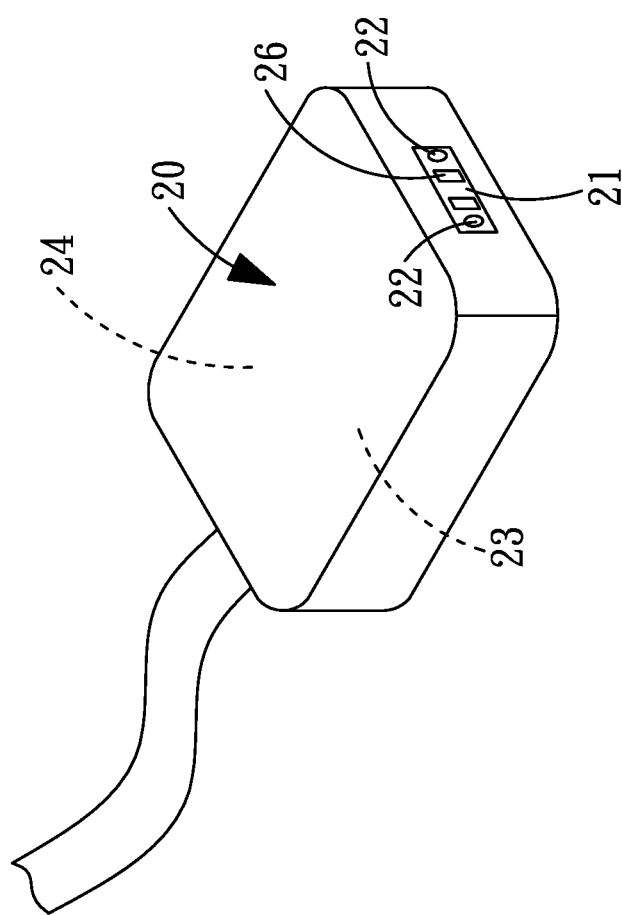
FIG. 3 is a schematic diagram of a power supply unit according to a second embodiment of the present invention.

In embodiments shown in FIG. 1 and FIG. 2, a power conversion module 23 is disposed inside a casing of the power supply unit 20 of the charging system. Alternating current power is converted by the power conversion module 23 into direct current power for charging or operating the electronic product 30. The charging system of the invention as shown in FIG. 3, at least one rechargeable battery 24 is disposed inside the casing of the power supply unit 20. The rechargeable battery 20 supplies direct current power for charging or operating the electronic product to form a movable power source with convenient carry.

Figure 4:
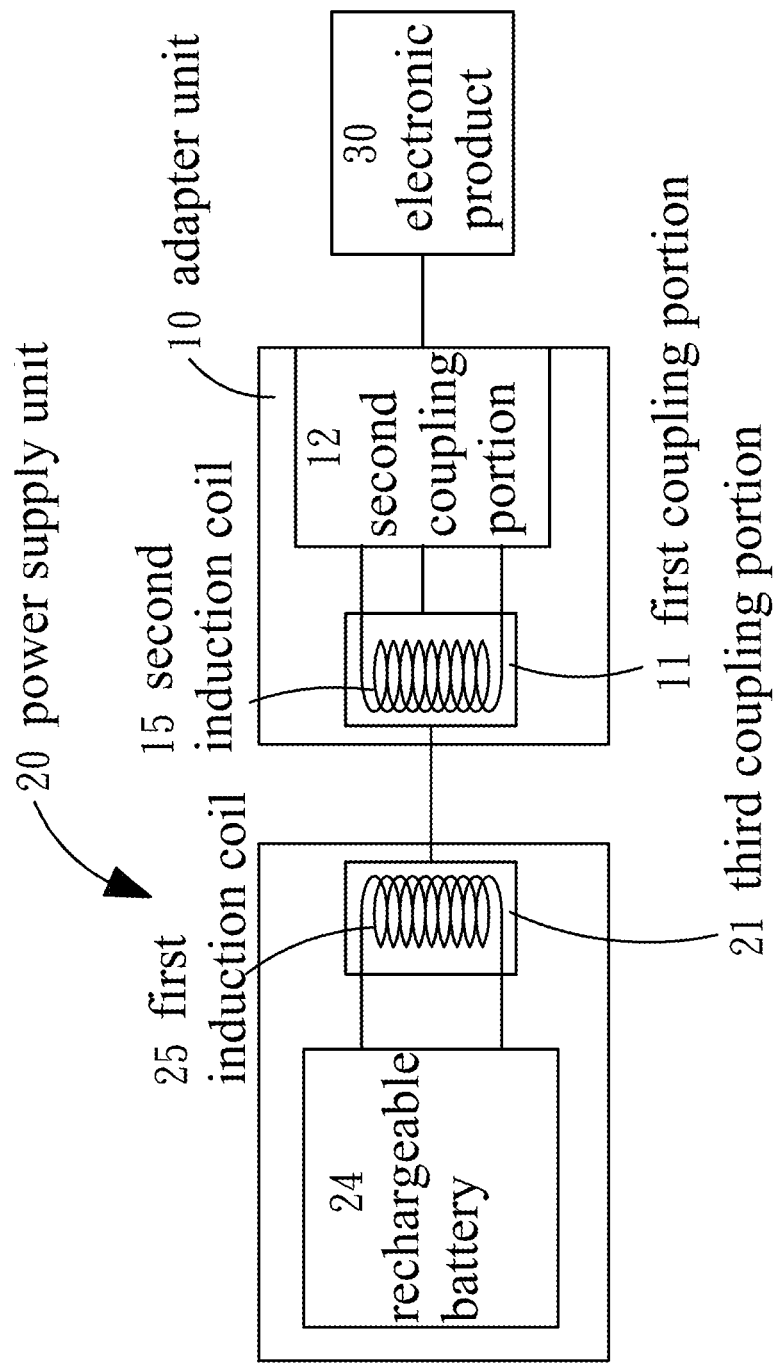
FIG. 4 is a schematic diagram of a power supply unit according to a second embodiment of the present invention.

Of course, the charging system of the invention can be shown in FIG. 4, a power conversion module 23 and at least one rechargeable battery 24 are disposed inside the casing of the power supply unit 20. The power conversion module 23 converts alternating current power into direct current power as a supplement power for the rechargeable battery 24, and the rechargeable battery 24 supplies power required for charging or operating the electronic product.

Moreover, the charging system of the invention can be shown in FIG. 1 and FIG. 3, the third coupling portion 21 of the power supply unit 20 has electrode contacts 26 with predetermined numbers/formats. The first coupling portion 11 of the adapter unit 10 has electrode contacts 14 with predetermined numbers/formats. Electrical connection is formed by contacting the electrode contacts 26, 14 to achieve a goal of delivering power to the electronic product 30 from the power supply unit 20.

Further, the charging system of the invention can be shown in FIG. 4, at least one rechargeable battery 24 is disposed inside the power supply unit 20. The third coupling portion 21 has a first induction coil 25 connected to the rechargeable battery 24. The first coupling portion 11 of the adapter unit 10 has a second induction coil 15. The second induction coil 25 is connected to the second coupling portion 12. Since the first induction coil 25 and the second induction coil 15 induces electromagnetic waves, the rechargeable battery 24 supplies power required for charging or operating the electronic product 30 to achieve a goal of charging the electronic product 30 in a non-contact manner.

Figure 5:
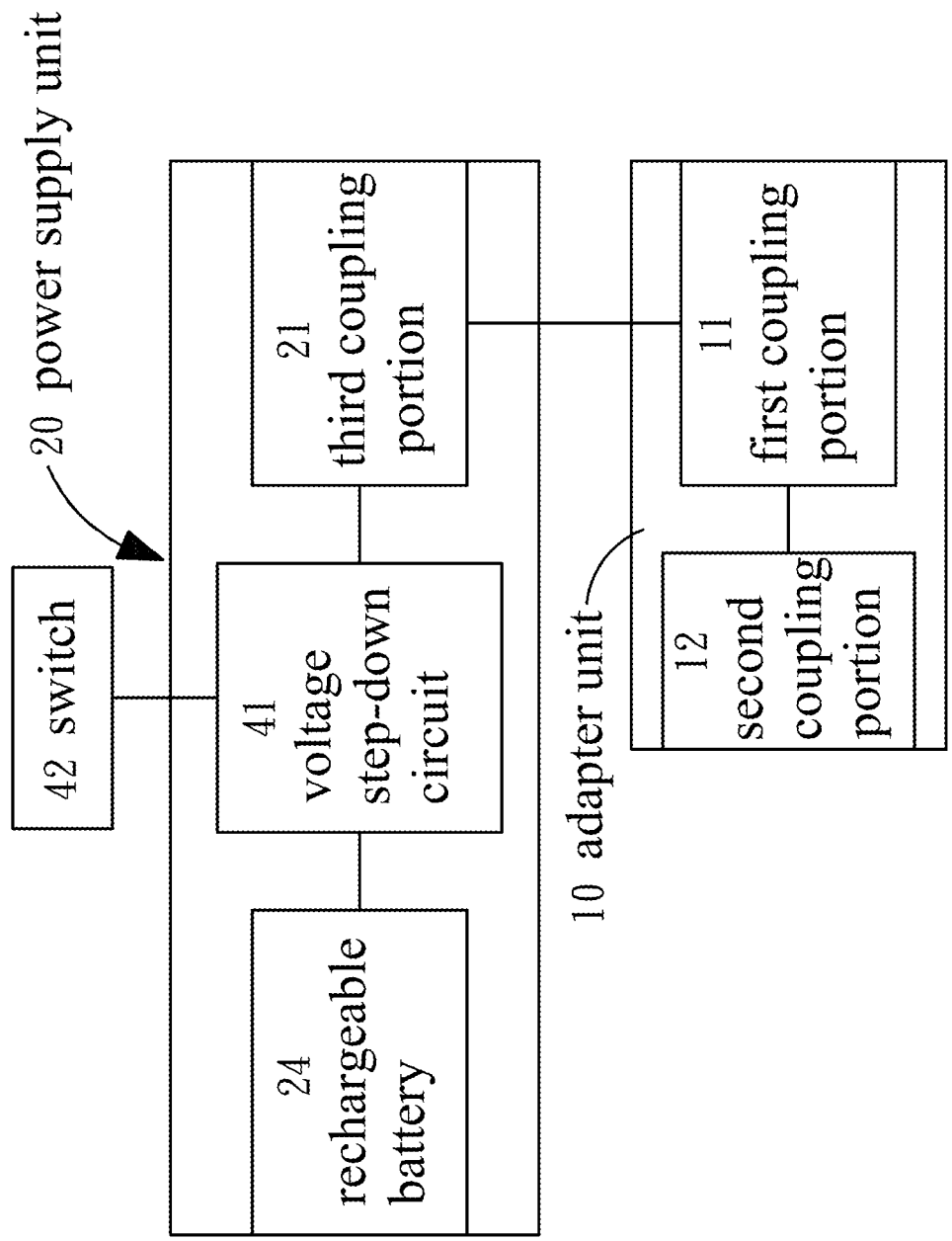
FIG. 5 is a block diagram of an assembled architecture of a charging system according to a third embodiment of the present invention.

In the foregoing embodiments, the charging system of the invention can further integrate a voltage step-down circuit 41 inside the casing of the power supply unit 20 and dispose a switch 42, which switches output voltage of the voltage step-down circuit 41, on the power supply device 10. As shown in FIG. 5, power of charging or operating the electronic product 30 is manually switched according to a demand of the electronic product 30. Of course, the voltage step-down circuit can be disposed inside the adapter.

Figure 6:
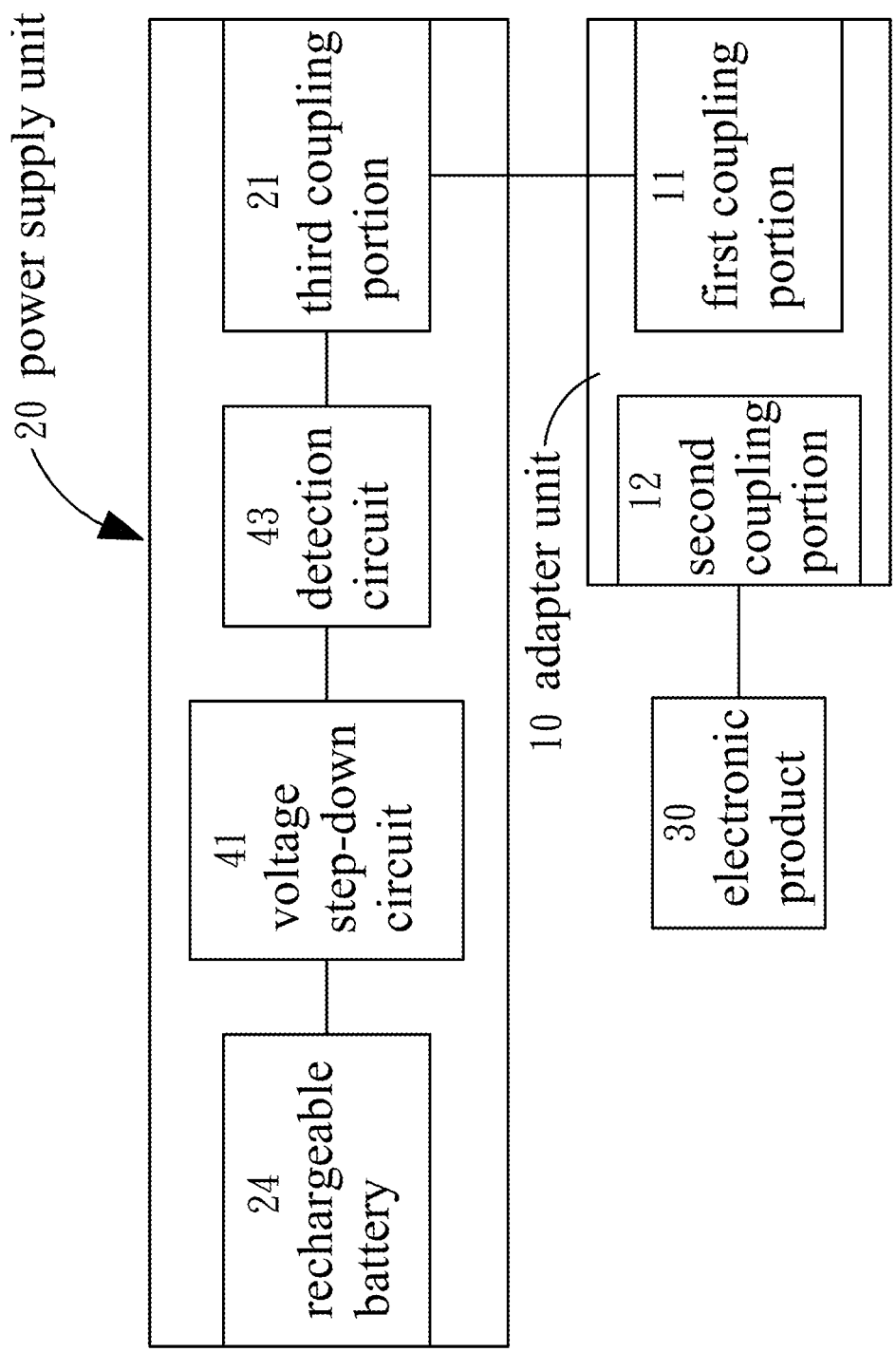
FIG. 6 is a block diagram of an assembled architecture of a charging system according to a fourth embodiment of the present invention.

In the foregoing embodiments, the charging system of the invention can be shown in FIG. 6, a voltage step-down circuit 41 and a detection circuit 43, which is electrically connected to the first coupling portion 11 and the voltage step-down circuit 41, are integrated inside the casing of the power supply unit 20. The detection circuit 43 is used for detecting the status of the electronic product 30 and automatically regulates the output voltage of the voltage step-down circuit 41 to supply power required for charging or operating the electronic product. Further, when the electronic product 30 is completely charged, the voltage step-down circuit 41 is stopped supplying power to the electronic product 30.

Figure 7:
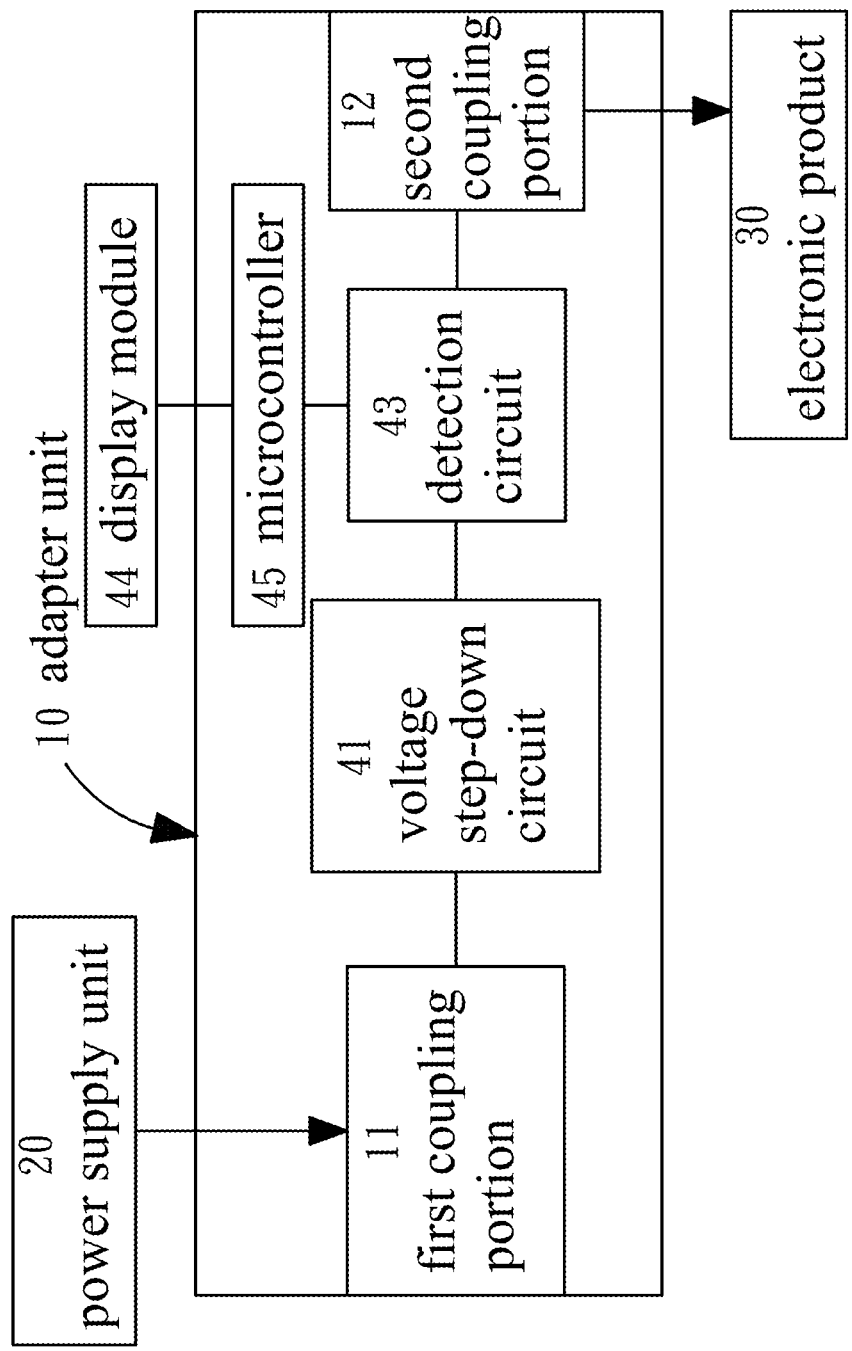
FIG. 7 is a block diagram of an assembled architecture of a charging system according to a fifth embodiment of the present invention.
Figure 8:
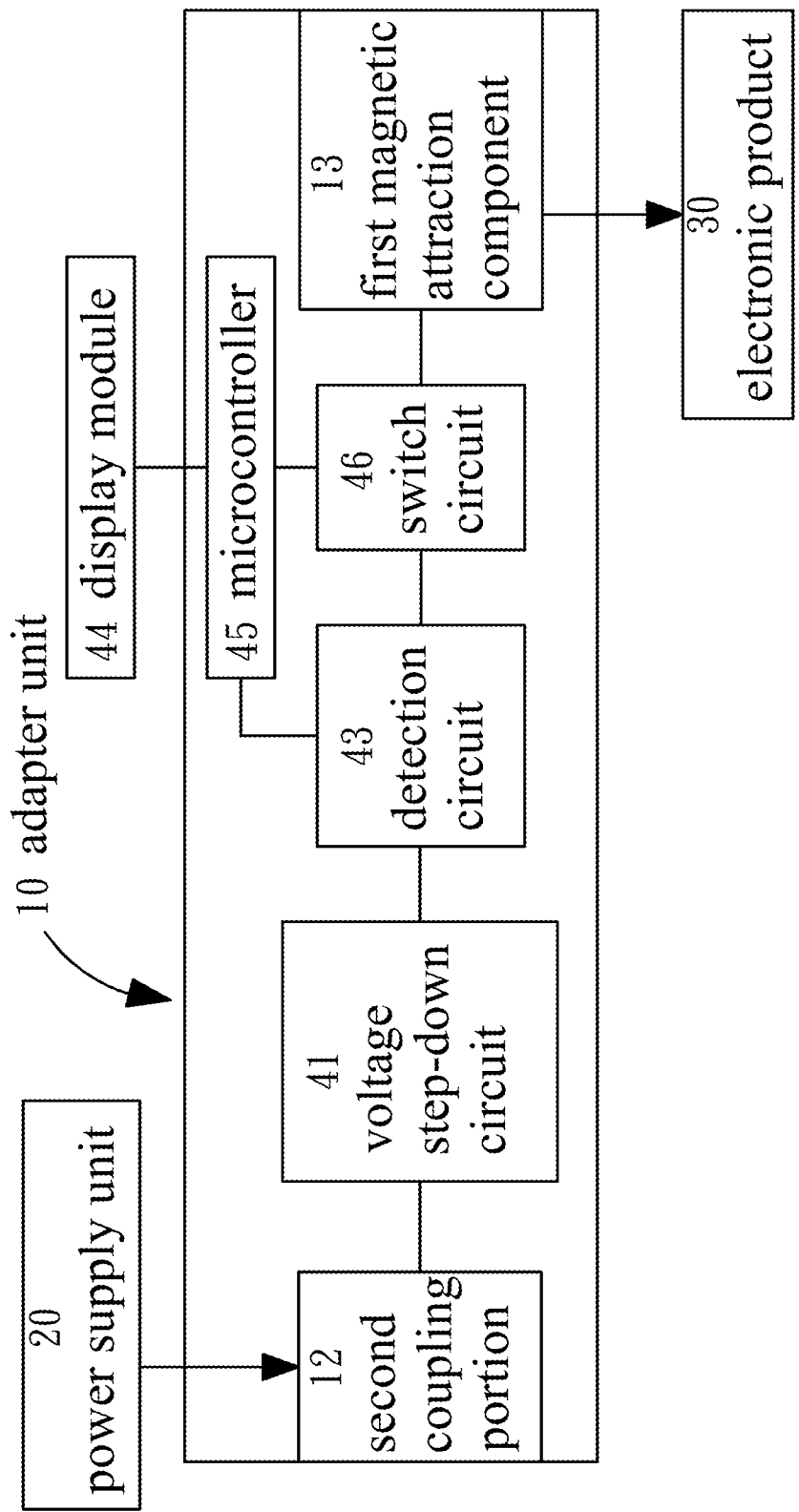
FIG. 8 is a block diagram of an assembled architecture of a charging system according to a sixth embodiment of the present invention.

The voltage step-down circuit 41 and the detection circuit 43 can also be disposed inside the adapter 10 as shown in FIG. 7. The detection circuit 43 can further detect current transmission state of the first coupling portion 11 and the second coupling portion 12. A display module 44 is disposed on the casing of the adapter 10 to display the operation state of the power adapter. A microcontroller 45 is disposed inside the casing. The microcontroller 45 is electrically connected to the detection circuit 43 and the display module 44 and presets a plurality of control modes corresponding to the display module 44. The microcontroller mainly receives signals of the detection circuit 43 and controls the operation of the display module 44. A switch circuit 46 is further disposed inside the casing of the adapter 10 as shown in FIG. 8. The switch circuit 46 is electrically connected to the first coupling portion 11, the second coupling portion 12 and the microcontroller 45. The microcontroller 45 controls the motion of the switch circuit 46 based upon the signals of the detection circuit 43 to control whether or not circuits of the first coupling portion 11 and the second coupling portion 12 are conducted, thereby preventing the service life of the electronic product from being influenced by unusual power supply.

Figure 9:
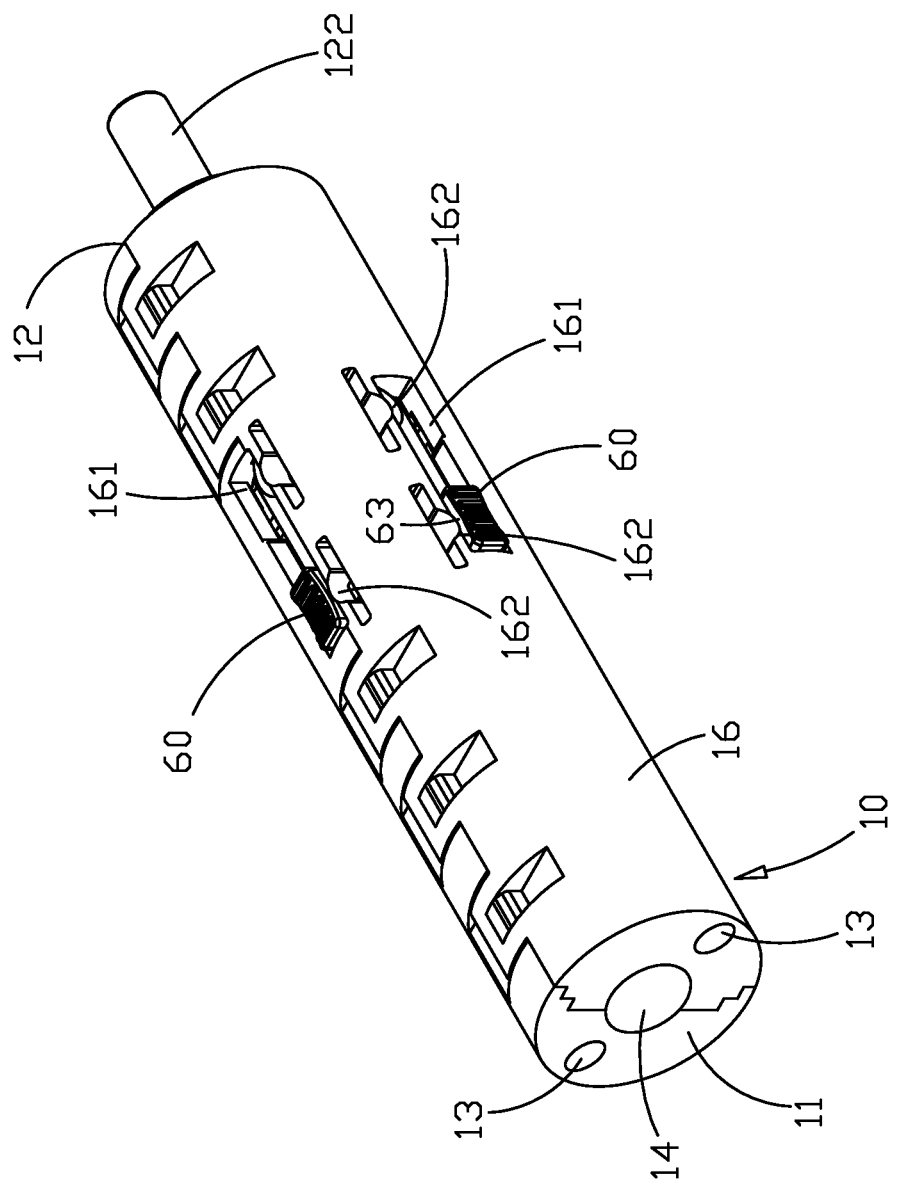
FIG. 9 is a structural diagram of an appearance of an adapter unit according to a seventh of the present invention.
Figure 10:
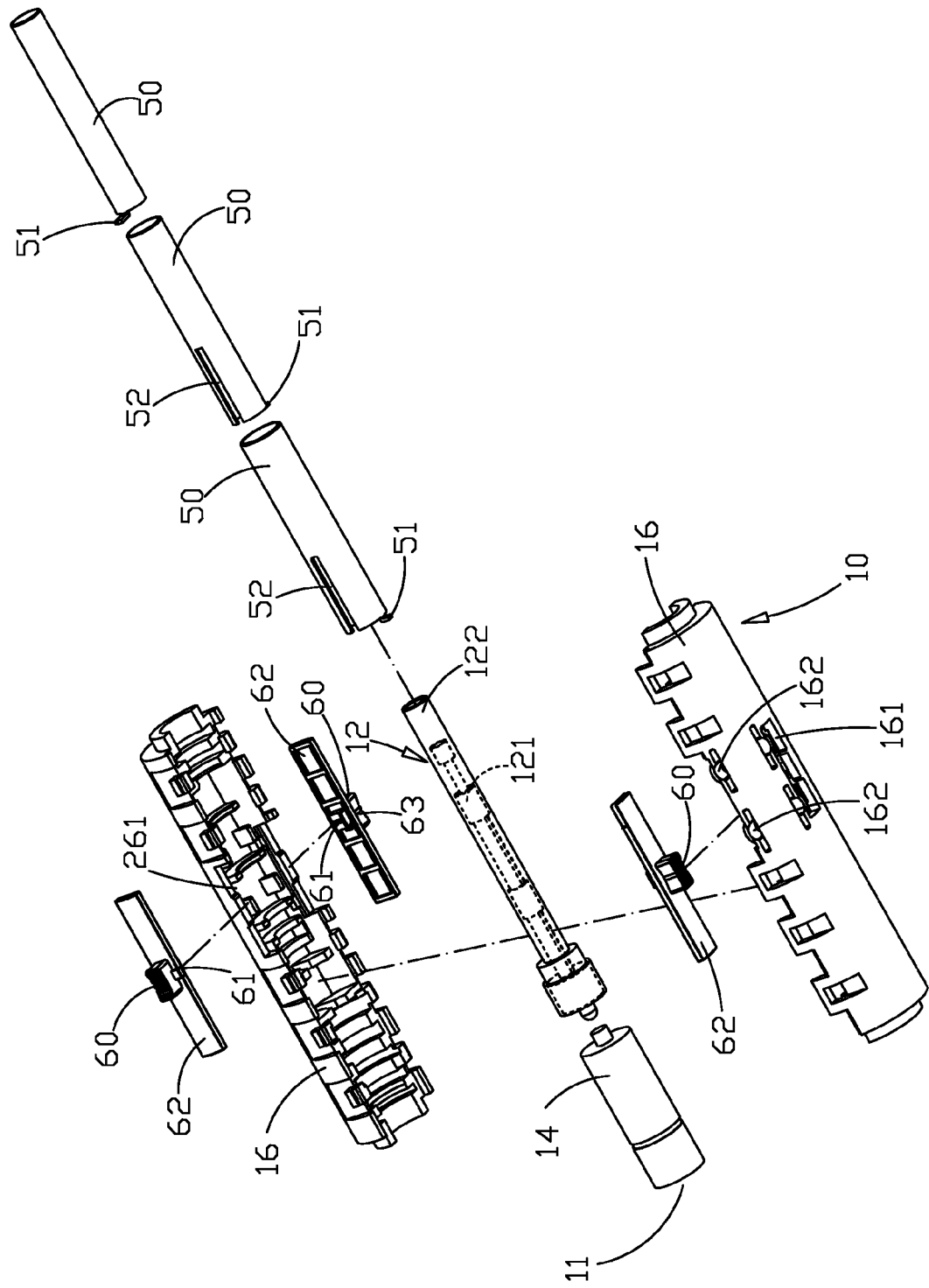
FIG. 10 is a decomposition drawing of an adapter unit according to a seventh of the present invention.

As shown in FIG. 9 and FIG. 10, when the adapter is implemented, the adapter unit 10 comprises a casing 16, the first coupling portion 11, the second coupling portion 12, several movable conduction sleeves 50, and several push buttons 60 correspondingly disposed with the movable conduction sleeves 50. The casing 16 has several slot holes 161 axially arranged. The first coupling portion 11 is disposed on the casing 16 and has electrode contacts 14 with predetermined numbers/formats, and the second magnetic attraction component 13.

The second coupling portion 12 is disposed on the casing 16 and electrically connected to the first coupling portion 11. The second coupling portion 12 has an electrode spindle 121 and an electrode bushing 122 normally stretching out the casing.

The several movable conduction sleeves 50 are sequentially laminated to an external ring of the electrode bushing 122 and respectively connected to the push button 60 piercing through the casing. Each movable conduction sleeve 50 can be relatively shifted and retain the junction effect. The movable conduction sleeve 50 located to the extreme inner layer rubs against the electrode bushing 122.

Figure 11:
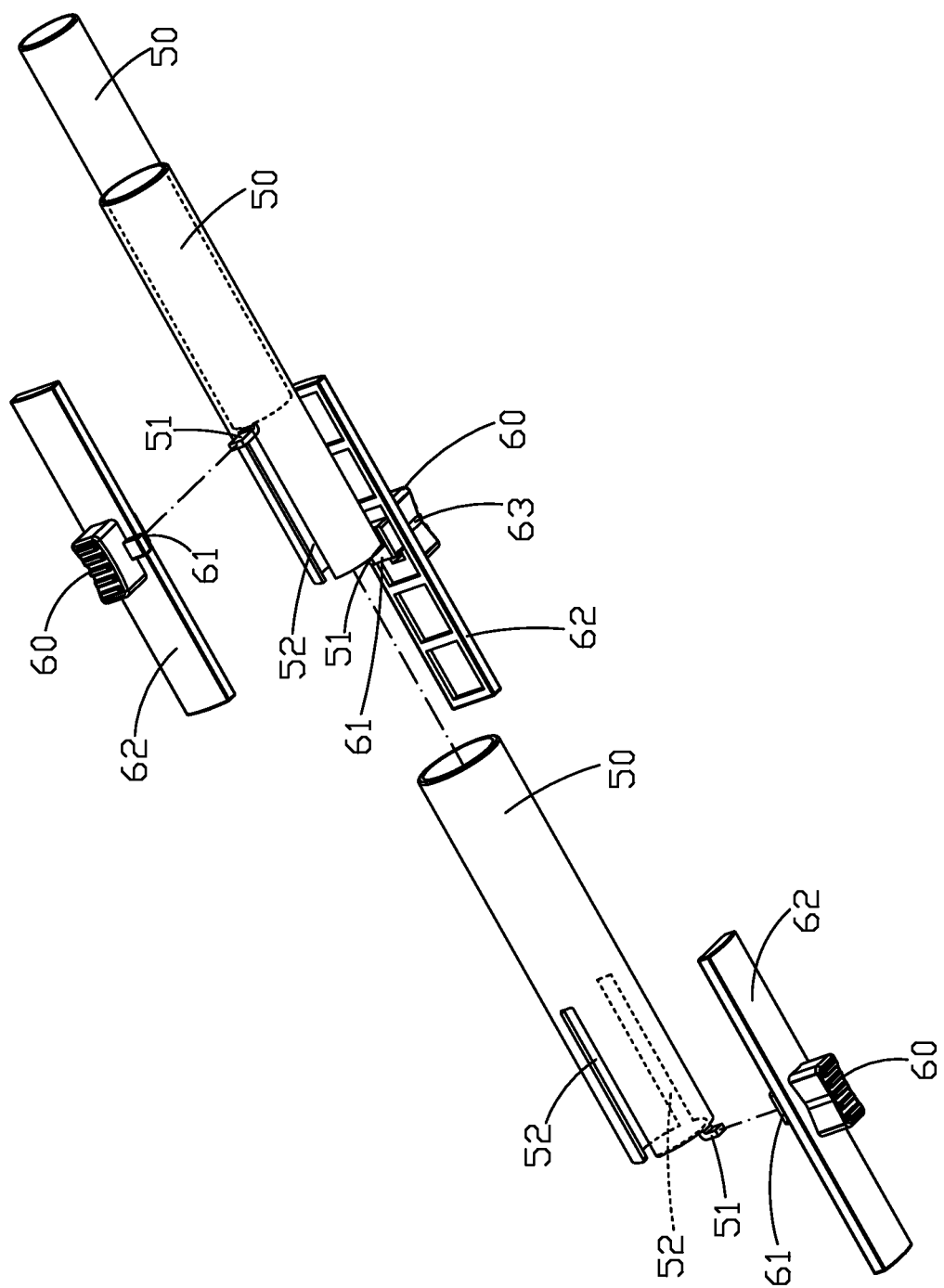
FIG. 11 is a decomposition drawing of a movable conduction sleeve and a push button according to the present invention.
Figure 12:
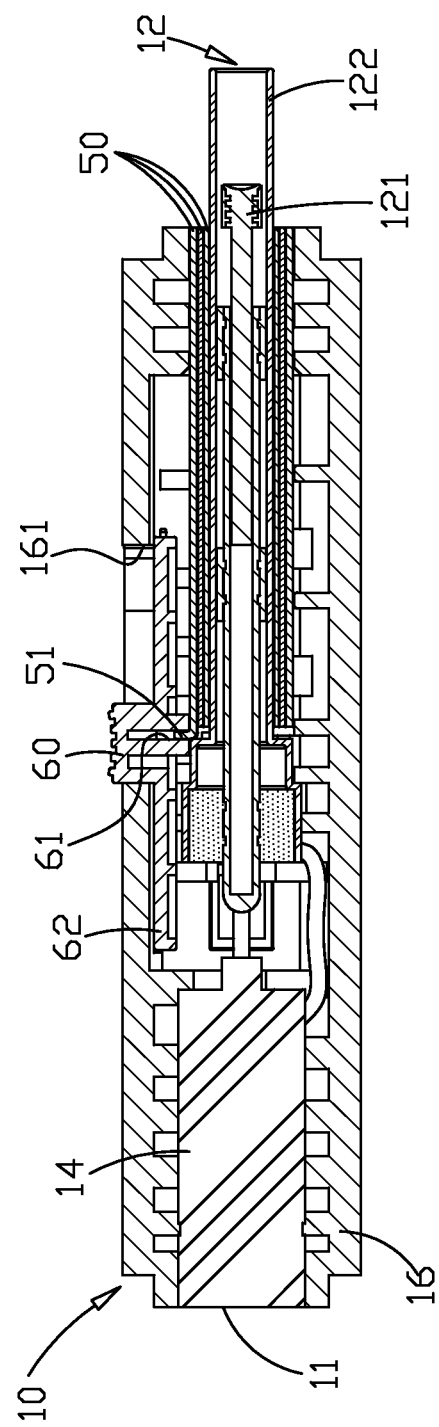
FIG. 12 is a cross-sectional drawing of a structure according to the present invention.
Figure 13:
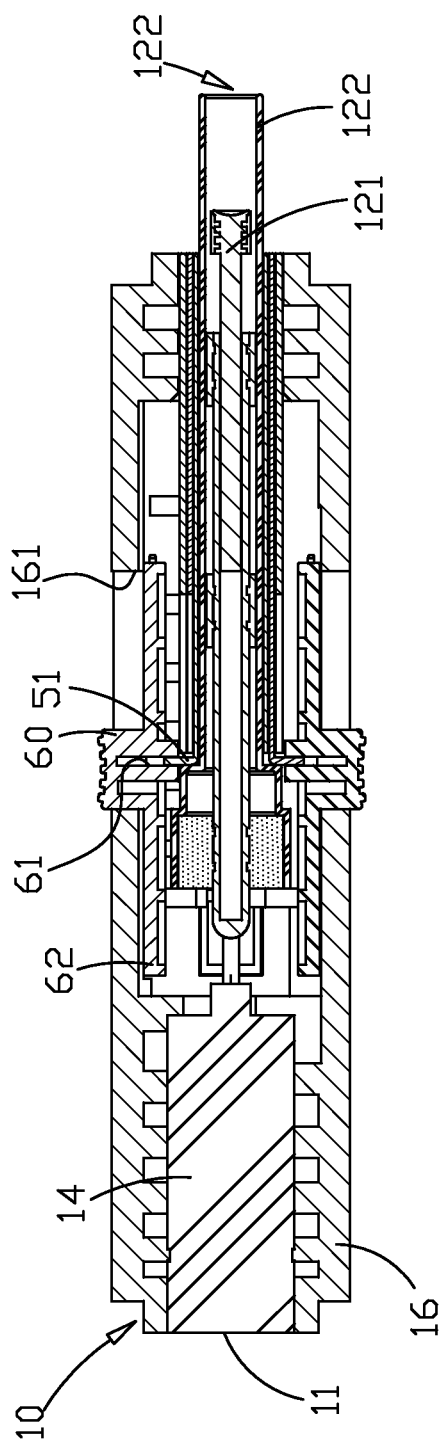
FIG. 13 is a cross-sectional drawing of a structure at another angle according to the present invention.

The several push buttons 60 individually pierce through the slot hole 161 of the casing 16 and are connected to the movable conduction sleeve 50 to form a linking effect together with the movable conduction sleeve 50. While in implementation, as shown in FIG. 11 to FIG. 13, each push button 60 is disposed with a clamping port 61 at a side of the casing 16. A tail of each movable conduction sleeve 50 is bent with a protrusion plate 51 for inserting into the clamping port 61 of the push button 60 to form the linking effect between the push button 60 and the movable conduction sleeve 50. More specifically, a tail of the movable conduction sleeve 50, which is relatively disposed to the outer layer, is equipped with a trough 52 that is passed by the protrusion plate 51 of the movable conduction sleeve 50 relatively disposed to the inner layer, thereby relatively reducing the length of the adapter unit 10.

Figure 14:
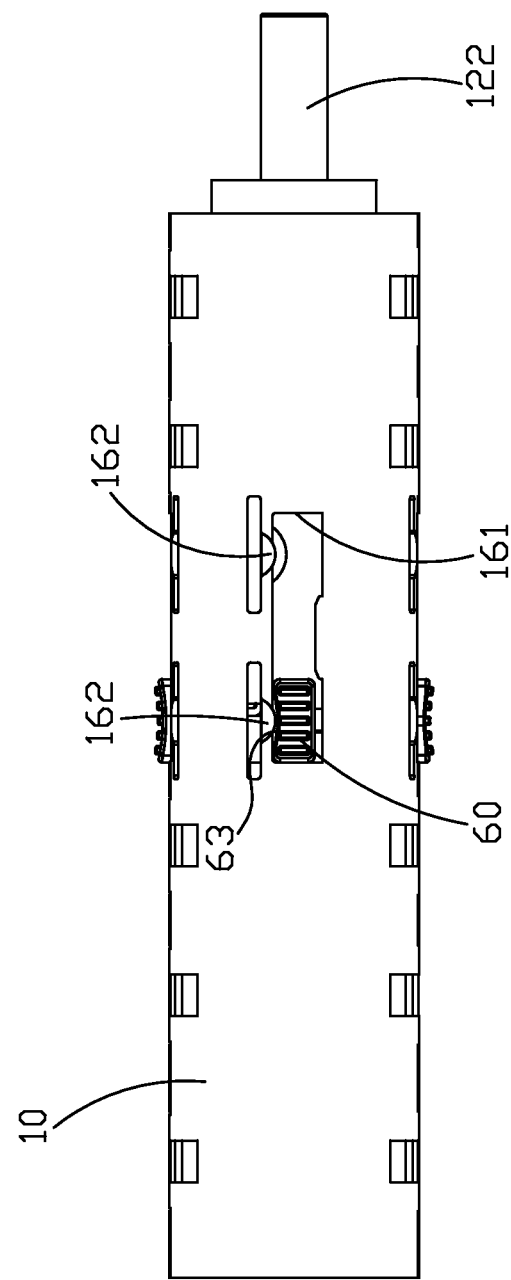
FIG. 14 is a schematic diagram of positioning status of a push button according to the present invention.

Each push button 60 is disposed with an extending plate 62 for covering the slot hole 161 of the casing 16 and a positioning cavity 63 at its wall surface. The casing 16 has flexible protruding buckles 162 at two ends of the sliding stroke performed by the push button 60 in each slot hole 161 to cross the positioning cavity 63 of the push button 60 as shown in FIG. 14, thereby achieving goals of positioning the push button 60 and the movable conduction sleeve 50.

With reference to FIG. 10 and FIG. 13, when the adapter unit 10 of the invention is used, it does not only electrically connect a user object from the second coupling portion, but also allows the user to selectively push one or multiple movable conduction sleeves 50 toward a front of the casing 16 through the push button 60 relatively appearing the casing 16. The movable conduction sleeves 50 at different positions or having different numbers are utilized to incorporate with the electrode bushing 122 to form a specific externally diameter so as to match the application demand for different objects.

Figure 15:
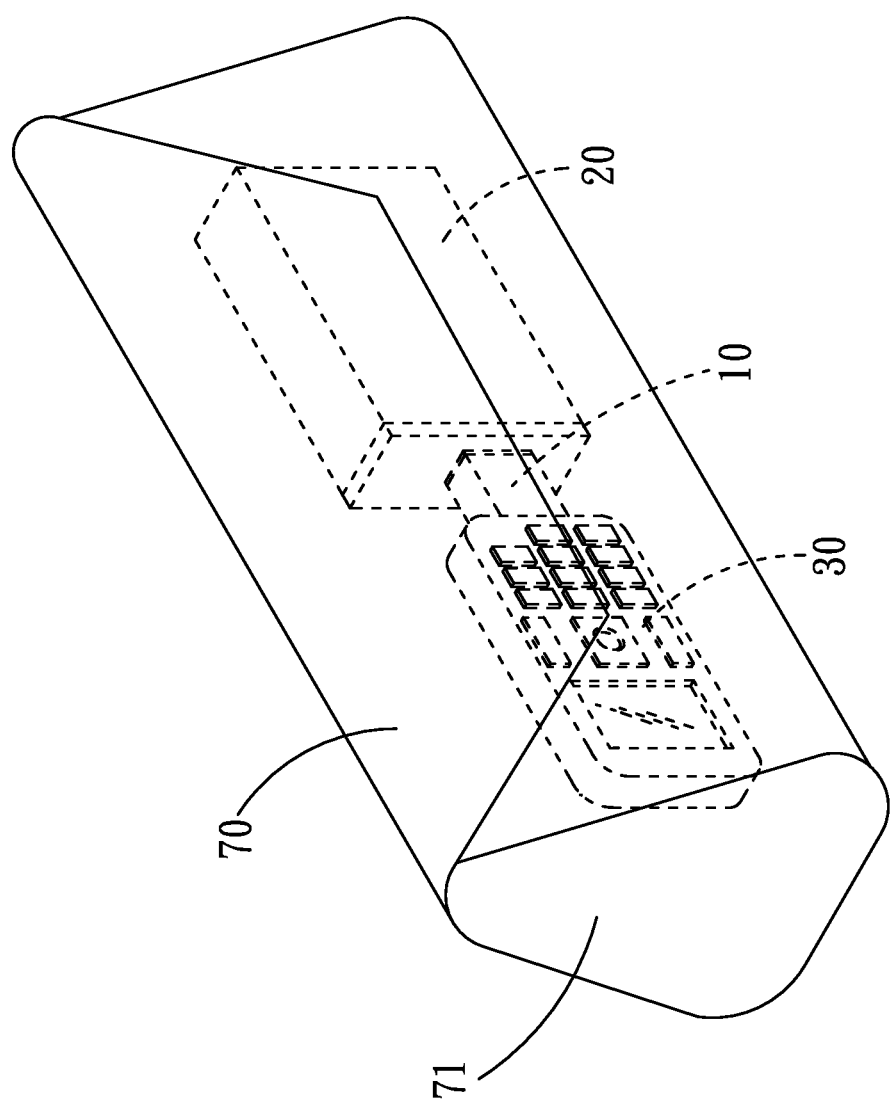
FIG. 15 is a schematic diagram of a charging system according to an eighth embodiment of the present invention.

Further, the charging system of the invention can further comprise a storage unit 70 (a cell phone case as shown in the figure) as shown in FIG. 15 for containing the power supply unit 20 under a structural shape exhibited by the movable power source. The storage unit 70 has a channel 71 provided for entering and exiting the electronic product 30 and for positioning the electronic product 30 to ensure coupling the adapter unit 10 and the power supply unit 20.

Specifically, the charging system of the invention does not only deliver power of the power supply unit to the electronic product through replacement of different adapter units so as to charge the electronic product real-time, but also further utilizes magnetic attraction effect to form the junction effect between the adapter unit and the power supply unit. When a user urgently needs to take the electronic product, the electronic product can be separated from the power supply unit by slightly imposing forces. The electronic product can be quickly taken without influencing the operation of the electronic product such that the practicality and the convenience of the charging system can be relatively improved.

The charging system improves over the prior art and complies with patent application requirements, and thus is duly filed for patent application. While the invention has been described by device of specific embodiments, numerous modifications and variations could be made thereto by those generally skilled in the art without departing from the scope and spirit of the invention set forth in the claims.

What is claimed is:
1. A charging system comprising:
an electronic product having at least one electrode contact;
at least one adapter unit having a first coupling portion electrically connected to a power supply unit and a second coupling portion electrically connected to the electronic product on a casing of the adapter unit, the second coupling portion having an electrode contact matching a specification of the electronic product;
the power supply unit having a third coupling portion electrically connected to the first coupling portion of the adapter unit on a casing of the power supply unit; and
a first magnetic attraction component and a second magnetic attraction component, which are attracted to each other, are respectively disposed to a coupling portion between the adapter unit and the power supply unit,
wherein a voltage step-down circuit and a detection circuit electrically connected to the first coupling portion, the second coupling portion and the voltage step-down circuit are integrated into the adapter unit, and output voltages of the voltage step-down circuit are automatically regulated through the detection circuit detecting a status of the electronic product,
wherein the detection circuit further detects current transmission states of the first coupling portion and the second coupling portion, and the casing of the adapter unit is equipped with a display module for displaying an operation status of the power adapter, and
a microcontroller is disposed inside the casing, and
the microcontroller is electrically connected to the detection circuit and the display module and presets a plurality of control modes corresponding to the display module to mainly receive signals of the detection circuit and control an operation of the display module.

2. The charging system as recited in claim 1,
wherein a power conversion module is disposed inside the casing of the power supply unit, and the power conversion module converts alternating current power into direct current power required for charging or operating the electronic product.

3. The charging system as recited in claim 1,
wherein at least one rechargeable battery is disposed inside the casing of the power supply unit, and the rechargeable battery supplies direct current power for charging or operating the electronic product.

4. The charging system as recited in claim 3,
wherein the charging system further comprises a storage unit for containing the power supply unit, and the storage unit is disposed with a channel for entering and exiting the electronic product and positioning the electronic product to ensure coupling the adapter unit and the power supply unit.

5. The charging system as recited in claim 1,
wherein a power conversion module and at least one rechargeable battery are disposed inside the casing of the power supply unit, and the power conversion module converts alternating current power into direct current power for supplementing power to the rechargeable battery, and the rechargeable battery provides power required for charging or operating the electronic product.

6. The charging system as recited in claim 5,
wherein the first coupling portion of the power supply unit has electrode contacts with predetermined numbers/formats, and the second coupling portion of the adapter unit has electrode contacts with predetermined numbers/formats.

7. The charging system as recited in claim 1,
wherein the first coupling portion of the power supply unit has electrode contacts with predetermined numbers/formats, and the second coupling portion of the adapter unit has electrode contacts with predetermined numbers/formats.

8. The charging system as recited in claim 1,
wherein at least one rechargeable battery is disposed inside the casing of the power supply unit, and
the third coupling portion has a first induction coil connected to the rechargeable battery, and
the first coupling portion of the adapter unit has a second induction coil connected to the second coupling portion, and
the first induction coil and the second induction coil are configured to induce an electromagnetic current to allow the rechargeable battery to supply power for charging or operating the electronic product.

9. The charging system as recited in claim 1,
wherein the first magnetic attraction component and the second magnetic attraction component are respectively composed of a magnet and an iron member.

10. The charging system as recited in claim 1,
wherein the first magnetic attraction component and the second magnetic attraction component are composed of magnets.

11. The charging system as recited in claim 1,
wherein a voltage step-down circuit is integrated into the adapter unit and a switch of switching output voltages of the voltage step-down circuit is disposed on the adapter unit.

12. The charging system as recited in claim 1,
wherein a switch circuit is further disposed inside the casing, and
the switch circuit is electrically connected to the first coupling portion, the second coupling portion and
the microcontroller, and the microcontroller controls a motion of the switch circuit based upon signals of the detection circuit so as to control whether or not circuits of the first coupling portion and the second coupling portion are conducted.

13. The charging system as recited in claim 1,
wherein a voltage step-down circuit is integrated inside the casing of the power supply unit, and a switch for switching output voltages of the voltage step-down circuit is disposed to the power supply unit.

14. The charging system as recited in claim 1,
wherein a voltage step-down circuit and a detection circuit electrically connected to the third coupling potion and the voltage step-down circuit are integrated into the casing of the power supply unit, and output voltages of the voltage step-down circuit are automatically regulated through the detection circuit detecting a status of the electronic product.

15. A charging system comprising:
an electronic product having at least one electrode contact;
at least one adapter unit having a first coupling portion electrically connected to a power supply unit and a second coupling portion electrically connected to the electronic product on a casing of the adapter unit, the second coupling portion having an electrode contact matching a specification of the electronic product;
the power supply unit having a third coupling portion electrically connected to the first coupling portion of the adapter unit on a casing of the power supply unit; and
a first magnetic attraction component and a second magnetic attraction component, which are attracted to each other, are respectively disposed to a coupling portion between the adapter unit and the power supply unit,
wherein several slot holes are axially arranged to the casing of the adapter unit, and
the electrode contact of the second coupling portion has an electrode spindle and an electrode bushing stretching out of the casing normally, and
several movable conduction sleeves are sequentially laminated over the electrode bushing to relatively shift between movable conduction sleeves and to retain a junction effect through mutual contacting, and
the movable conduction sleeve at an extreme inner layer rubs against the electrode bushing, and several push buttons pierce through the slot hole of the casing, and each push button is connected to the movable conduction sleeve to form a linking effect together with the movable conduction sleeve.

16. The charging system as recited in claim 15,
wherein each push button is equipped with a clamping port at a side inside the casing, and a tail of each movable conduction sleeve is bent with a protrusion plate provided for inserting into the clamping port of the push button, and a tail of the movable conduction sleeve, which is relatively disposed to an outer layer, is equipped with a trough that is passed by the protrusion plate of the movable conduction sleeve.

17. The charging system as recited in claim 15, wherein each push button is disposed with a positioning cavity at a wall surface of the push button, and the casing has flexible protruding buckles at two ends of a sliding stroke performed by the push button in each slot hole to cross the positioning cavity of the push button.

* * * * *